M. A. YEAKLEY.
POWER TRANSMITTING MECHANISM.
APPLICATION FILED SEPT. 17, 1910. RENEWED NOV. 23, 1914.
1,145,451.
Patented July 6, 1915.
2 SHEETS—SHEET 1.
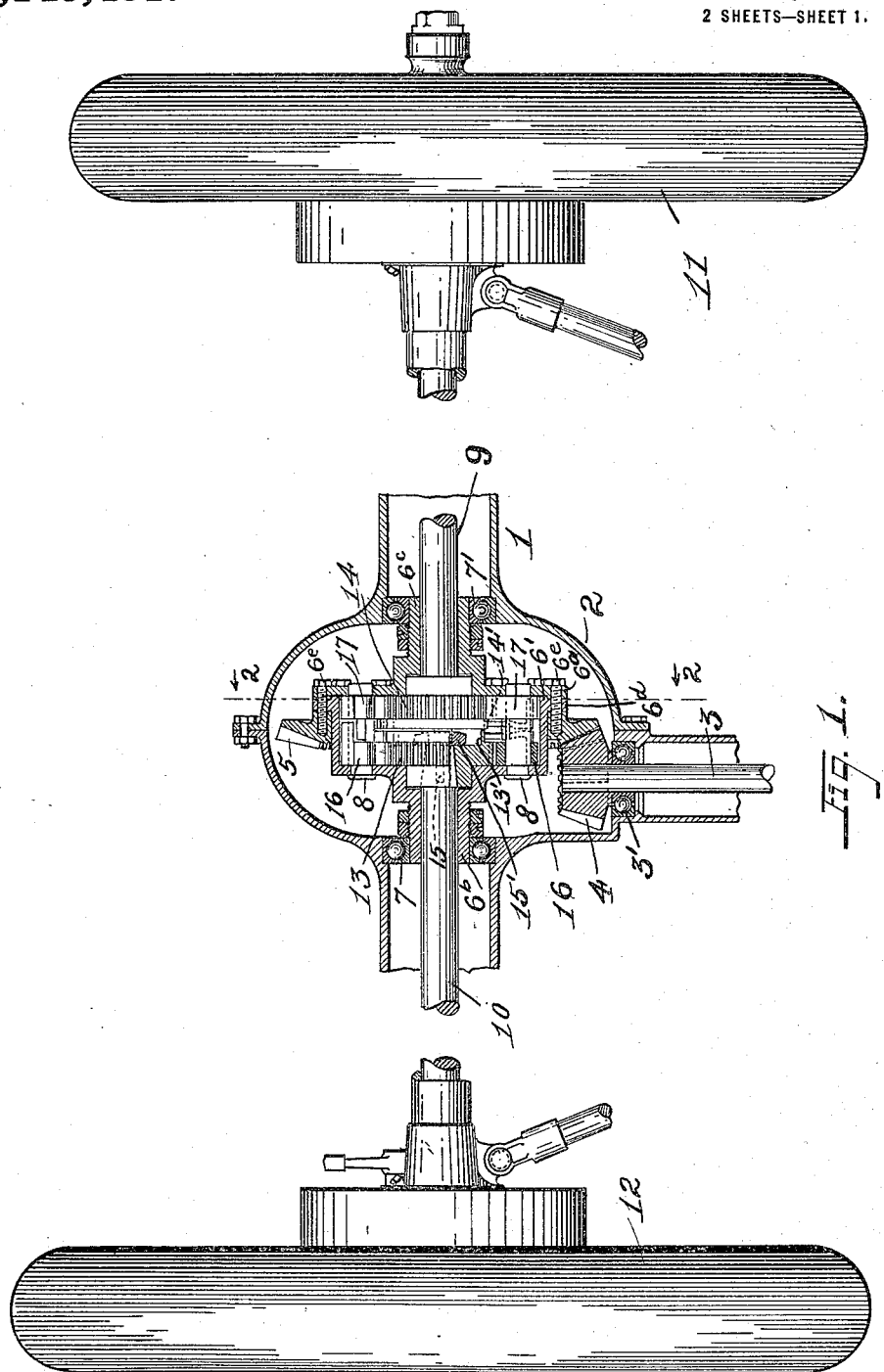

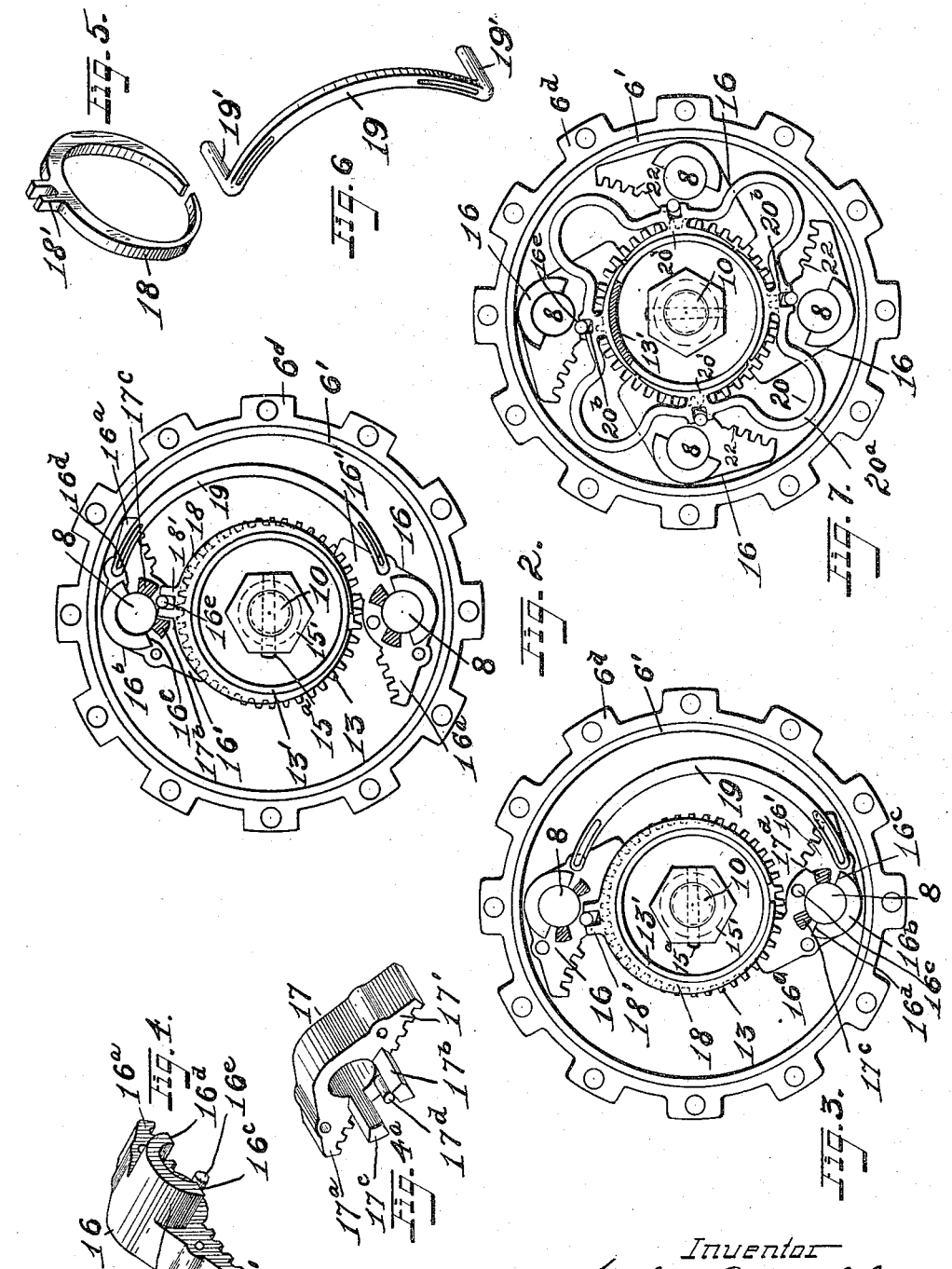

UNITED STATES PATENT OFFICE.

MELVIN A. YEAKLEY, OF CANTON, OHIO.

POWER-TRANSMITTING MECHANISM.

1,145,451. Specification of Letters Patent. Patented July 6, 1915.

Application filed September 17, 1910, Serial No. 582,524. Renewed November 23, 1914. Serial No. 873,636.

*To all whom it may concern:*

Be it known that I, MELVIN A. YEAKLEY, a citizen of the United States, residing at Canton, in the county of Canton and State of Ohio, have invented certain new and useful Improvements in and Relating to Power-Transmitting Mechanism, of which the following is a specification.

This invention relates to power transmitting devices, more particularly to differential mechanism of the class adapted to transmit power to the driving wheels of a motor vehicle which rotate about a common axis, in such manner as to cause the power to be delivered, equally to both wheels under certain conditions, to rotate them for either forward or backward running; again, permit either wheel automatically and freely to over-run the other, and also permit retarding or braking action to be effected through the said power transmitting mechanism itself, when desirable or necessary.

Devices embodying my invention may be so constructed as to readily replace differential or compensating gear mechanism in automobiles, motor vehicles or traction engines, as now in general use, without alteration of the other parts of the axle and power transmitting mechanisms.

For the purpose of illustration I have shown in the accompanying drawings one design of power transmitting device embodying my invention.

Figure 1 is a view of one well known type of rear axle construction for an automobile including driving wheels, provided with a power transmitting device embodying my invention, parts being broken away, and others shown in section. Fig. 2 is a section on the line 2—2 of Fig. 1, with the parts arranged for forward rotation. Fig. 3 is a section on same line as Fig. 2, but with the parts arranged for backward rotation. Fig. 4 is a perspective view of one of the interlocking pawl members detached. Fig. 4$^a$ is a perspective view of another interlocking pawl member, detached. Fig. 5 is a perspective view of one of the friction rings detached. Fig. 6 is a perspective view of one of the connecting links detached. Fig. 7 illustrates a modification of my invention.

In the drawings, 1 indicates the axle housing as an entirety, it having an enlarged central portion 2 adapted to receive the differential and driving mechanism. This housing may be constructed in any well known manner. I have merely shown the enlarged central portion 2 as formed in sections separable on the central, vertical, longitudinal line of the axis of the propeller or drive shaft 3 which is suitably journaled in a bearing 3' at the front end of the said enlarged housing portion 2.

4 is a bevel drive pinion secured to the end of the propeller shaft 3 within the housing enlargement 2. It meshes with a bevel gear 5.

6 is a casing member comprising a cup shaped part 6' and an end plate 6$^a$. The cup shaped part 6' of the casing member carries a lateral tubular extension 6$^b$ suitably journaled in the axle housing, as indicated at 7, and the end plate 6$^a$ has a lateral tubular extension 6$^c$, suitably journaled in the axle housing as indicated at 7'.

8 are transverse shafts or pins, each having one end connected with the end plate 6$^a$ and its opposite end connected with the vertical wall of the cup shaped part 6'. This cup shaped part carries an annular flange 6$^d$. 6$^e$ are bolts connecting the bevel gear 5, plate 6$^a$ and annular flange 6$^d$ together.

9 and 10 indicate the live rear axle sections axially alined, and suitably mounted in the rear axle housing. To their outer ends, respectively, these shaft sections have secured the drive wheels 11 and 12. At their inner adjacent ends, within the housing enlargement 2, each has secured to it, in any suitable manner, a toothed or ratchet wheel, as indicated at 13, 14, respectively. For the purpose of illustration I have shown the connection between each of such toothed or ratchet wheels and its corresponding axle section as by means of a key 15, nut 15' and pin 15$^a$.

16 are pawl members, and one or more of which, as desired, may be used, each loosely mounted on one of the shafts 8 and having the forward drive pawl 16' and rearward drive pawl 16$^a$, each arranged for independent engagement with the ratchet wheel 13. These drive pawls may each have one or more teeth for ratchet engaging purposes. In the device illustrated each pawl has four such teeth. 17 are similar pawl members, each loosely mounted on one of the shafts 8 and having a forward drive pawl 17' and rearward drive pawl 17$^a$, and each arranged for independent engagement with the ratchet wheel 14. At its inner side each pawl member 16 carries an inwardly extending curvilinear lug or projection 16$^b$ providing interlocking surfaces 16$^c$, 16$^d$ at its opposite ends.

16$^e$ is an operating stud or lug carried by the member 16. Each pawl member 17 has a pair of inwardly extending lugs or interlocking stops 17$^b$, 17$^c$ and an operating stud or lug 17$^d$. These stops 17$^b$, 17$^c$ are shaped and proportioned to lie in the plane of the coöperating interlocking lug 16$^b$ on the adjacent pawl member 16 and to permit certain relative movement of the pawl members to each other before the interlocking member 16$^b$ will engage with either of the stops 17$^b$, 17$^c$, on the pawl member 17.

Each of the ratchet wheels 13 and 14 carries an inwardly turned base or shoulder, as indicated at 13′, 14′, respectively, upon which is mounted a friction member or yoke 18 having a recessed extension 18′ to receive the adjacent operating lug 16$^e$, 17$^d$, as the case may be. Where more than one pair of interlocking pawl member 16, 17 is used, I have found it beneficial to interconnect them, so that the corresponding pawls of each pair will operate simultaneously. In the drawings in Figs. 1 to 3 and 6 are shown links 19 preferably of resilient material for this purpose. Each link at either end has a lateral extension 19′ which enters a corresponding recess in the adjacent pawl. The resiliency of the links accommodates for any slight irregularities of engagement of the connected pawls respectively with the teeth of the adjacent ratchet.

In Fig. 7 I have illustrated the use of four pairs of pawl members, and a single friction member 20 for simultaneously operating all of the corresponding pawls of each pair. Such friction member 20 may be formed with separated shoes 20′ for engagement with the friction shoulder on the ratchet wheel, and interconnecting resilient loops 20$^a$. Connection with the pawl members may be effected as before described by recesses in the friction member, as indicated at 20$^b$, and the operating lugs on the pawl members.

It may be found advisable to make the first teeth at either end of the pawls to engage the ratchet on all but one of the connected pawls of a series, slightly shorter than the others, so that when the one first perfect tooth on the pawl with perfect teeth goes into place the other shorter first teeth on the remaining pawls of the series will find their proper places simultaneously and will not engage with and remain engaged with top surfaces of any of the teeth of the ratchet. This is illustrated in Fig. 7, teeth 22 being shorter than the others.

In operation, assuming the driven wheels are running straight ahead on a smooth level surface, power is transmitted from the propeller shaft and bevel pinion 4 to the bevel gear 5 with which the casing 6 and pawl carrying shafts 8 rotate. When the power is first applied the resistance to turning of the driven or traction wheels 11 and 12 is sufficient to cause the ratchet wheels 13, 14, to momentarily lag; this tendency to lag will be likewise incident to the friction members 18 on each ratchet which will serve to rock or swing the forward drive pawls 16′ and 17′ into engagement with the ratchet wheels 13 and 14, respectively, and power will be transmitted equally to both of the driven wheels 11 and 12. Assuming now that while running forward a turn is made to the right, it will be necessary for the wheel 12 to rotate more rapidly than the wheel 11. In other words, it is desirable that this wheel 12 should overrun the wheel 11 and that power shall at the same time be transmitted from the propeller shaft 3 to the wheel 11 which is rotating more slowly than the then outside wheel 12. My differential mechanism under such circumstances automatically accommodates itself to the requirements, for as soon as it is necessary for the outside wheel, in this instance driven wheel 12, to run faster than the inside wheel, there will be a tendency of the ratchet 14 to run faster than the bevel gear 5 through which power is being transmitted to the driven wheel 11. Co-incident with this faster running or overrunning of the then-outside wheel 12 and the ratchet 14 connected therewith, the friction element 18 associated with the ratchet 14 will swing the pawl members 17 so as to remove the forward drive pawls 17′ from the path of the ratchet teeth on the wheel 14. Such action of the friction element 18 is prevented from throwing the rearward drive pawls 17$^a$ into the path of the ratchet teeth on the wheel 14, because of the engagement of the stop 17$^b$ on the pawl element 17 with the surface 16$^c$ of interlocking member 16$^b$ on the pawl member 16. The forward drive pawl 16′ on this latter pawl member is in driving engagement with the ratchet 13 and is transmitting power thereto. Under such conditions, therefore, the pawl element 17 is held neutral and inoperative for power transmitting purposes relative to the ratchet 14, and consequently, the then-outside wheel 12 is permitted to overrun the inside wheel 11 to any required degree. It will be understood that in the event a corner is being turned in the opposite direction to that just described, the pawl member 16 will be thrown out of driven engagement with the ratchet 13, and will be held in neutral position by engagement of its inwardly extending interlocking projection 16$^b$ with one stop 17$^b$ or 17$^c$, as the case may be, on the pawl member 17, thus permitting the then-outside wheel 11 to overrun to any necessary extent, either forward or backward, the inside wheel 12 which is receiving power.

It will be understood that when it is desired to reverse the direction of the rotation of the driven wheels 11 and 12, by means of reversing the direction of rotation of the propeller shaft 3, my differential mechanism will automatically accommodate and adjust itself to the required conditions, of relationship of its constituent parts, the friction members 18 operating to throw the pawls 16ª and 17ª into engagement with the teeth of the ratchet wheels 13 and 14 so as to transmit reverse direction of rotation to the traction wheels. It will be understood that when reversing, either wheel may overrun the other in going around a curve, the functions and operations of the parts being such as to automatically accommodate themselves to the necessary conditions.

In the event that it is desired to apply a brake or retarding influence to the driven wheels through the power transmitting devices heretofore described, it will be readily observed that they will automatically and immediately accommodate themselves for such purposes. Assuming, for example, that the traction wheels 11 and 12 are rotating so as to propel the device forward, and a brake or retarding influence is exerted through the propeller shaft 3, as the speed of this shaft is slowed down, the speed of rotation of the bevel gear 5 is instantly affected, and the ratchet wheels 13 and 14 will start to overrun the bevel 5, whereupon the friction elements 18 will instantly operate to throw in the backing pawls 16ª and 17ª into engagement with the ratchet wheels 13 and 14 and thereby cause substantially the instantaneous application of the retarding or braking influence to the forward direction of rotation of the driven wheels 11 and 12. It will be understood that this same operation will occur in the event that the driving wheels both overrun the speed of the propeller shaft 3 at any time during the operation of the mechanism illustrated in the drawings. This being the case, in a motor vehicle the resistance of the motor to the overrunning of the traction wheels may be employed in slowing down such drive wheels when descending a grade.

It will be understood that neither of the double pawls nor series thereof can be reversed in driving operation or retarding operation independently of the other, in such instance each being dependent upon the other because of the coöperative relation between them, effected by the interlocking or inter-engaging devices carried by them.

It will be understood that the necessary throw of the pawl members 16 and 17 in order to bring their forward or rearward drive pawls into or out of engagement with their respective ratchets, may be increased or decreased according to the size of the ratchet teeth. As a matter of fact, the length of travel or throw of the double pawls in either direction may be made very short, so as to insure that there will practically be no back lash or sudden jar in the operation of the mechanism under any circumstances or conditions.

It will be understood that devices embodying my invention may be employed on jack shafts or counter-shafts and elsewhere where differential power transmitting devices of the class are required, as well as in such embodiments as illustrated in the drawings. To those skilled in the art to which this class of mechanism relates it will be apparent that the scope and spirit of my invention may be embodied in various adaptations.

When any power is transmitted through the device, the power transmitting elements through which it is transmitted are in positive engagement each with the next in the train. The parts are all simple and cheap to construct, may be made very durable and are not affected in their operation by metallic dust and the like which may collect in the differential housing chamber 2, and be distributed through or over the differential mechanism therein by the oil or lubricant which is usually employed for lubricating such parts.

It is thought that it will add to the clearness of this specification and the claims to state that, in the claims where the words, driven members or toothed driven members, are employed, is meant the elements 13 and 14 on the alined shafts 9 and 10, while by the term "intermediate transmitter" is meant the driven or ring gear 5 and all elements which always rotate with it in either direction, including the parts for supporting the double pawl elements.

What I claim is:—

1. In mechanism of the class described, the combination of driven members, an intermediate transmitter, and engaging and disengaging elements carried by said transmitter, interposed between it and said driven members, and each adapted independently and positively to engage one of said driven members and apply power simultaneously to said driven members, or permit either of said driven members to overrun the other, said engaging and disengaging elements having interlocking connections between them whereby each is held out of engagement with the driven member with which it coöperates when one of said driven members overruns the intermediate transmitter and the other driven member is receiving power from said intermediate transmitter.

2. In mechanism of the class described, the combination of driven members, an intermediate transmitter, and means connected with said intermediate transmitter for transmitting power to each of said driven members simultaneously, while allowing either of said driven members to overrun the other, said means having interlocking parts so co-related that the power transmitting connections from said intermediate transmitter to a driven member is held out of engagement with the driven member with which it is adapted to coöperate by the corresponding means for transmitting power to the other driven member during such overrunning.

3. In mechanism of the class described, the combination of an intermediate transmitter including a driven gear, driven members and engaging and disengaging devices between said intermediate transmitter and the driven members operating to transmit power in either direction at the same time to both of said driven members or permit either one of the said driven members to overrun the other, the said engaging and disengaging devices having coöperating interlocking parts serving to hold out of engagement and in neutral position the engaging element for either driven member when the other driven member is overrunning it in either direction.

4. In mechanism of the class described, the combination of an intermediate transmitter, driven members, each independent of the other, and interlocked positive engaging and disengaging devices interposed between said intermediate transmitter and said driven members, the interlocking of the engaging and disengaging devices serving to hold either of said devices out of power transmitting relation to its respective driven member when the latter is overrunning the other driven member.

5. In mechanism of the class described, the combination of an intermediate transmitter, driven members, each independent of the other, interlocked engaging and disengaging devices interposed between said intermediate transmitter and said driven members, the interlocking of the engaging and disengaging devices serving to hold either of said devices out of power transmitting relation to its respective driven member when the latter is overrunning the other driven member, and friction controlled means for operating said engaging and disengaging devices.

6. In mechanism of the class described, the combination of an intermediate transmitter, driven members, each independent of the other, and engaging and disengaging devices interposed between and adapted to establish positive connection between the intermediate transmitter and the driven members, and operating to transmit power in either direction at the same time to both of said driven members, or permit either one of said driven members to overrun the other entirely free from contact or engagement with either of said engaging and disengaging devices.

7. In mechanism of the class described, the combination of an intermediate transmitter, driven members, each independent of the other, engaging and disengaging devices interposed between and adapted to establish positive connection between the intermediate transmitter and the driven members, and operating to transmit power in either direction at the same time to both of said driven members, or permit either one of said driven members to overrun the other, and independent friction operated means for actuating each of said engaging and disengaging devices.

8. In mechanism of the class described, the combination of an intermediate transmitter, driven members each independent of the other, a pair of pawl members, each of said pawl members interposed between said intermediate transmitter and one of said driven members and having an interlocking connection with the other pawl member to limit relative movements of said pawl members and means for actuating said pawl members.

9. In mechanism of the class described, the combination of an intermediate transmitter, driven members each independent of the other, a pair of interlocked pawl members, each of said pawl members interposed between said intermediate transmitter and one of said driven members, and friction controlled means for operating said pawl members.

10. In mechanism of the class described, the combination of an intermediate transmitter, driven members each independent of the other, a pair of interlocked pawl members, each of said pawl members interposed between said intermediate transmitter and one of said driven members, and independent friction controlled means carried by said driven members for actuating said pawl members.

11. In mechanism of the class described, the combination of an intermediate transmitter, driven members, each independent of the other, a pair of double acting pawl members, each of said pawl members interposed between said intermediate transmitter and one of said driven members, and having an interlocking connection with the other pawl member to limit relative movement of said pawl members and friction controlled means for actuating said double pawl members.

12. In mechanism of the class described, the combination of an intermediate transmitter, driven members each independent of the other, and positive acting engaging and disengaging devices interposed between said intermediate transmitter and each of said driven members and including means for holding either of said engaging and disengaging devices free from engagement with the driven member with which it is adapted to coöperate to permit entirely free overrunning of its driven member while the other of said engaging and disengaging devices is positively transmitting power to the other driven member.

13. In mechanism of the class described, the combination of an intermediate transmitter, driven members each independent of the other, positive acting engaging and disengaging devices interposed between said intermediate transmitter and each of said driven members and including means for holding either of said engaging and disengaging devices out of engagement with the driven member with which it is adapted to coöperate to permit the noiseless overrunning of its driven member while the other of said engaging and disengaging devices is positively transmitting power to the other driven member, and friction controlled means for actuating said engaging and disengaging devices.

14. In mechanism of the class described, the combination of an intermediate transmitter, driven members each independent of the other, and engaging and disengaging devices for positively operating each driven member in either direction interposed between said intermediate transmitter and each of said driven members, and including means for holding either of said engaging and disengaging devices out of engagement with the driven member with which it is adapted to coöperate to permit the free overrunning of its driven member while the other of said engaging and disengaging devices is positively transmitting power to the other driven member.

15. In mechanism of the class described, the combination of an intermediate transmitter, driven members, each independent of the other, a shaft carried by said intermediate transmitter, a pair of double acting pawls each loosely mounted on said shaft and adapted to engage with and be disengaged from one of said driven members, respectively and each carrying an interlocking member disposed to engage with a corresponding interlocking member on the other pawl to limit the relative movement of the pawls to each other, and means for moving said pawls into and out of engagement with their respective driven members.

16. In mechanism of the class described, the combination of an intermediate transmitter, toothed driven members each independent of the other, a pair of pawls, each interposed between said intermediate transmitter and one of said toothed members, means for holding either of said pawls free from engagement with the toothed member with which it is adapted to coöperate to permit entirely free over-running of said toothed members while the other of said pawls is positively transmitting power to the other toothed member, and means for moving said pawls into and out of engagement with their respective toothed members.

17. In mechanism of the class described, the combination of an intermediate transmitter, toothed driven members each independent of the other, a pair of pawls, each interposed between said intermediate transmitter and one of said toothed members, means for holding either of said pawls free from engagement with the toothed member with which it is adapted to coöperate to permit entirely free over-running of either of said toothed members while the other of said pawls is positively transmitting power to the other toothed member, and means actuated by said toothed driven members for moving said pawls into and out of engagement with said toothed members, respectively.

18. In mechanism of the class described, the combination of an intermediate transmitter, toothed driven members each independent of the other, and positive acting engaging and disengaging devices interposed between said intermediate transmitter and each of said toothed members and including means for moving and holding either of said engaging and disengaging devices free from engagement with the toothed member with which it is adapted to coöperate to permit entirely free over-running of its toothed member while the other of said engaging and disengaging devices is positively transmitting power to the other toothed member.

19. In differential mechanism, the combination of an intermediate transmitter, driven members, double-acting engaging and disengaging elements carried by said transmitter and each adapted to engage and disengage one of said driven members, respectively, and means operated by said driven members for effecting the engagement of each of said engaging and disengaging elements with said driven member with which it coöperates.

20. In differential mechanism, the combination of an intermediate transmitter, driven members, double-acting engaging and disengaging elements carried by said transmitter and each adapted to engage and disengage one of said driven members, respectively, and means operated by said driven members for effecting the engaging and disengaging of each of said engaging and disengaging elements with said driven member with which it coöperates.

21. In diffrrential mechanism, the combination of an intermediate transmitter, a pair of toothed driven members, pawls carried by said transmitter adapted to drive each of said toothed driven members in either direction, respectively, and means operated by said toothed driven members for noiselessly tilting said pawls into or out of the path of the teeth of either of said toothed driven members.

22. In differential mechanism, the combination of an intermediate transmitter, a pair of toothed driven members, sets of pawls, each carried by said transmitter and adapted to drive one of said toothed driven members, respectively, in either direction, means operated by each of said toothed driven members to move one of said sets of pawls into and out of driving relation with its driven member, respectively, and controlling means adapted to hold the non-driving set of pawls from reversing while the other set is driving.

23. In differential mechanism, the combination of an intermediate transmitter, a pair of toothed driven members, a pair of double pointed pawls, friction rings, one supported on each toothed driven member and connected with one of said double pointed pawls, and pawl limiting means extending from one double pointed pawl to the other.

24. In differential mechanism, a pair of double pointed pawls, means for moving said pawls in opposite directions into and out of forward and reverse driving positions, and means interposed between said pawls and adapted to limit the movement of either of them by the position of the other.

25. In mechanism of the class described, a right and left set of driving and reversing pawls, friction means for independently moving the pawls of each set into and out of forward and reverse driving positions, and means interposed between the pawls of each set adapted to limit the movement of pawls of one set by the position of pawls of the other set.

26. In mechanism of the class described, the combination of an intermediate transmitter, toothed driven members, positive engaging and disengaging elements coöperatively interposed between each of said toothed driven members and said transmitter and each adapted to engage one of said toothed driven members, respectively, to drive it in either direction, means for throwing said engaging and disengaging elements into operative relation with said toothed driven members, and controlling means interposed between said engaging and disengaging elements and adapted to hold either of them from being reversed while the other is driving.

27. In mechanism of the class described, the combination of an intermediate transmitter, two toothed driven members, sets of pawls carried by said transmitter, each set adapted to drive one of said driven members in either direction and arranged so that said pawls will be in neutral position at midway between forward and reverse driving position, pawl operating means, and pawl controlling means extending from one set of pawls to the other and adapted to hold either set from being reversed while the other set is driving.

28. In differential mechanism, the combination of a driven casing, right and left driven members mounted in said casing, a pawl shaft supported in said casing, right and left double-acting pawls journaled on said pawl shaft and arranged to engage and drive their respective right and left driven members in either direction, right and left friction rings frictionally mounted on their respective right and left driven members and having operative connections to their respective right and left double-acting pawls, and pawl limiting stops on each right and left double-acting pawl, coacting and arranged so as to limit the movement of either right and left double-acting pawl by the position of the other.

In testimony whereof I affix my signature, in the presence of two witnesses.

MELVIN A. YEAKLEY.

Witnesses:
R. J. BULKLEY,
EDWARD R. ALEXANDER.

Copies of this patent may be obtained for five cents each, by addressing the "Commissioner of Patents, Washington, D. C."